United States Patent [19]
Spada et al.

[11] Patent Number: 5,817,426
[45] Date of Patent: Oct. 6, 1998

[54] ACRYLIC PRESSURE-SENSITIVE ADHESIVES FOR LOW-ENERGY SURFACES AND CORRUGATED BOARD

[75] Inventors: Lon T. Spada, Walnut; Carol A. Koch, San Gabriel, both of Calif.

[73] Assignee: Avery Dennison Corporation, Pasadena, Calif.

[21] Appl. No.: 760,375

[22] Filed: Dec. 4, 1996

[51] Int. Cl.$^6$ ........................................................ B23B 27/08
[52] U.S. Cl. ........................... 428/483; 428/511; 428/517; 526/282
[58] Field of Search .............................. 526/282; 428/480, 428/483, 511, 515, 517

[56] References Cited

U.S. PATENT DOCUMENTS

| | | | |
|---|---|---|---|
| H509 | 8/1988 | Chao | 526/264 |
| 4,243,500 | 1/1981 | Glennon | 204/159.12 |
| 4,311,729 | 1/1982 | Glennon | 428/345 |
| 4,912,169 | 3/1990 | Whitmire et al. | 525/221 |
| 5,164,444 | 11/1992 | Bernard | 524/833 |
| 5,187,235 | 2/1993 | Bordoloi et al. | 525/305 |
| 5,260,882 | 11/1993 | Blanco et al. | 364/496 |
| 5,434,213 | 7/1995 | Chen et al. | 524/533 |
| 5,602,221 | 2/1997 | Benner et al. | 526/307.7 |
| 5,683,798 | 11/1997 | Bennett et al. | |

FOREIGN PATENT DOCUMENTS

| | | |
|---|---|---|
| WO95/13328 | 5/1995 | WIPO . |
| WO95/13331 | 5/1995 | WIPO . |
| WO96/16134 | 5/1996 | WIPO . |

OTHER PUBLICATIONS

Stueben, Kenneth C., *Ultrviolet Cured Pressure —Sensitive Adhesives,* Adhesive Chemistry Developments and Trends, 1984, pp. 319–350.

Japan, JP59226076A, Dec. 1984, Abstract.
Japan, JP61223076A, Oct. 1986, Abstract.
Japan, JP5310810A, Nov. 1993, Abstract.
Japan, JP1315409A, Dec. 1989, Abstract.

*Primary Examiner*—Melvyn I. Marquis
*Assistant Examiner*—D. Aylward
*Attorney, Agent, or Firm*—Christie, Parker & Hale, LLP

[57] ABSTRACT

The invention provides inherently tacky PSAs that exhibit excellent adhesion to paper, corrugated board and low-energy surfaces, and comprise an acrylic emulsion polymer formed from (a) a plurality of monomers comprising, based on the total weight of monomers, (i) 9 to 40% isobornyl acrylate and (ii) 50 to 91% of one or more alkyl acrylates; (b) at least one initiator; and at least one emulsifier. In an alternate embodiment, the polymer is formed by solvent polymerization, without an emulsifier. A method for making such PSAs is also provided. In one embodiment, polymerization initiators are added to a monomer emulsion in a stepped feed.

31 Claims, No Drawings

ACRYLIC PRESSURE-SENSITIVE ADHESIVES FOR LOW-ENERGY SURFACES AND CORRUGATED BOARD

FIELD OF THE INVENTION

This invention relates to acrylic polymers that are inherently tacky and, as formed, are functional as pressure-sensitive adhesives. The adhesives exhibit excellent adhesion to a broad variety of surfaces and substrates, including paper, low-energy surfaces like polyethylene, and difficult-to-bond-to surfaces like corrugated board.

BACKGROUND OF THE INVENTION

Pressure-sensitive adhesives (PSAs) are now widely used in many consumer products, including labels, tapes, and similar constructions. Both acrylic and rubber-based PSAs are known. Many PSAs adhere well to only certain types of substrates and do not adhere or perform well when applied to other substrates. For example, Kraton® rubber-based hot-melt PSAs adhere extremely well to low-energy surfaces like polyolefins, but do not adhere as well to paper or corrugated board. Many acrylic-based PSAs exhibit good adhesion to paper, but do not adhere well to low-energy, non-polar surfaces. Although a tackifier can be added to acrylic adhesives to improve their adhesion to non-polar substrates, often this results in a lowering of shear, convertibility, and other performance characteristics.

As PSAs continue to be used in a growing number of applications, a need has emerged for a truly "broad spectrum" PSA that performs well on a variety of surfaces and substrates. Such an adhesive would be useful in both the prime label business (e.g., labels for consumer products—bottles, cans, etc.) and the information processing (IP) business (e.g., EDP, laser printer labels, price marking labels, inventory labels, etc.). A broad spectrum PSA would also be useful in self-adhesive postage stamps and in other applications. To be used in a postage stamp a PSA should be capable of forming a durable bond to paper, corrugated board and other surfaces, including low-energy surfaces such as polyethylene based envelope stock (e.g., Tyvek®, sold by DuPont de Nemours, E. I., Co., of Wilimington, Del.). To deter theft and re-use of stamps, it is desirable that the adhesive leave a telltale fiber tear mark on the paper envelope or package if attempts are made to remove the stamp.

SUMMARY OF THE INVENTION

According to the present invention, there are provided inherently tacky, pressure-sensitive adhesives (PSAs) that exhibit excellent adhesion to a variety of surfaces, including paper; non-polar, low-energy surfaces such as polyethylene; and difficult-to-bond-to surfaces such as corrugated board. The inherently tacky PSAs comprise an acrylic emulsion polymer formed from (a) a plurality of monomers, comprising, based on the total weight of monomers, (i) about 9 to 40 percent by weight of an ethylenically unsaturated monomer containing an isobornyl group, such as isobornyl acrylate, and (ii) about 50 to 91 percent by weight of one or more alkyl acrylates, the alkyl group of each alkyl acrylate having about 4 to 8 carbon atoms; (b) at least one emulsifier; and (c) at least one polymerization initiator. Minor amounts of additional monomers may also be included in the monomer mixture. Alternatively, the polymer is prepared by solvent polymerization, using a suitable solvent such as ethyl acetate, and no emulsifier is employed.

When dried and laminated to a facestock, such as paper or a polymeric material, the polymers exhibit pressure-sensitive adhesive behavior and adhere well to paper, corrugated board, and low-energy surfaces. In particular, when applied to a low-energy surface, such as polyethylene, adhesive constructions prepared in accordance with the present invention exhibit 180° peel adhesion to polyethylene of at least 3.5N/in—preferably at least 5.0N/in; more preferably at least 8.0N/in. When applied to a corrugated board substrate, the adhesive constructions exhibit a corrugated fiber tear of at least about 90%—more preferably at least about 95%. The adhesives are useful for a variety of label applications, including self-adhesive postage stamps and other PSA constructions.

The present invention also provides a method for making the unique PSAs, comprising the step of forming a synthetic latex by emulsion polymerization of the plurality of monomers, in the presence of at least one emulsifier and at least one polymerization initiator. Preferably, the initiators are added to the reaction mixture in a stepped, or ramped feed, beginning slowly and then doubling the rate of addition.

DETAILED DESCRIPTION

The present invention provides pressure-sensitive adhesives (PSAs) that exhibit good adhesion to a variety of substrates, including paper, corrugated board, and low-energy surfaces, such as polyethylene. In one embodiment, a PSA comprises an inherently tacky polymer formed by emulsion polymerization of (a) a plurality of monomers comprising, based on the total weight of monomers, (i) about 9 to 40 percent by weight of isobornyl acrylate and (ii) about 50 to 91 percent by weight of one or more alkyl acrylates, the alkyl group of each alkyl acrylate having about 4 to 8 carbon atoms; (b) at least one emulsifier; and (c) at least one polymerization initiator. In an alternative embodiment, an inherently tacky polymer is formed by solvent (solution) polymerization, using an organic solvent and no emulsifier.

Isobornyl acrylate (IBOA) is a high boiling, low odor, low toxicity, ethylenically unsaturated monomer containing an isobornyl group, a large ($C_{10}H_{17}$) cycloalkyl group that is believed to have a profound effect on the adhesive and rheologic properties of the resulting PSA. IBOA forms a homopolymer having a high glass transition temperature ($T_g$=94° C). Preferred PSAs are made using between about 20 and 30% by weight of IBOA, based on the total weight of monomers.

Useful alkyl acrylates having from 4 to 8 carbon atoms in the alkyl group include, but are not limited to, butyl acrylate (BA), ethylhexyl acrylate (EHA), and isooctyl acrylate (IOA).

Preferably, the plurality of monomers further comprises a minor amount of one or more additional monomers, the presence of which yields a PSA having improved adhesive, processing, and/or converting properties. Nonlimiting examples include polar monomers, such as acrylic acid (AA), methacrylic acid (MAA), beta-carboxyethyl acrylate (BCEA), acrylamides and methacrylamides; short chain alkyl acrylates and methacrylates having alkyl groups with up to three carbon atoms; and monohydric alkyl acrylates and methacrylates having alkyl groups with about 2 to 8 carbon atoms. Preferably, the one or more additional monomers are present in a total amount of from about 0.5 to no more than about 20 percent by weight, based on the total weight of all monomers.

Useful short chain alkyl acrylates and methacrylates include, without limitation, methyl, ethyl, and propyl acrylate and methacrylate, with methyl methacrylate (MMA) being preferred. Nonlimiting examples of monohydric alkyl acrylates and methacrylates include, without limitation, 2-hydroxy ethyl acrylate (2-HEA), hydroxy ethyl methacrylate, hydroxy propyl acrylate, and hydroxy propyl methacrylate.

In one embodiment of the invention, an inherently tacky, acrylic PSA is prepared by emulsion polymerization of a mixture of monomers comprising, based on the total weight of monomers, from about 9 to about 40 percent IBOA; from about 50 to about 80 percent of an alkyl acrylate with 4 to 8 carbon atoms in the alkyl group, for example, EHA; from about 1 to about 20 percent MMA; from about 1 to about 6 percent AA; and from about 0.5 to about 6 percent 2-HEA; in the presence of at least one polymerization initiator and one emulsifier.

A particularly preferred pressure-sensitive adhesive is made by emulsion polymerization of a mixture of monomers that comprises, based on the total weight of monomers, about 26 percent IBOA, about 66 percent EHA, about 3 percent MMA, about 3 percent AA, and about 2 percent 2-HEA.

Preferably, the polymerization is controlled (through selection and amount of monomers, chain transfer agents, etc.) so that the overall gel content of the resulting polymer is between about 20 and 70%, with 35–50% being most preferred. Gel content represents the amount of polymer that is insoluble in tetrahydrofuran (THF), expressed as a percent by weight. Gel content can be determined by the gel partitioning method described in U.S. Pat. No. 5,164,444 (Bernard), which is incorporated by reference herein. In general, for the polymers of the present invention, a lower gel content leads to improved adhesion to low-energy surfaces.

The inherently tacky acrylic polymers of the present invention are prepared by free-radical emulsion polymerization in an oxygen-free atmosphere, in the presence of suitable polymerization initiators and emulsifiers (surfactants). Alternatively, solvent polymerization is employed. Preferably, one or more activators and chain transfer agents (or other molecular weight regulators) are also employed in the reaction.

Suitable polymerization initiators include, but are not limited to, persulfates, such as sodium persulfate ($Na_2S_2O_8$), potassium persulfate, peroxy persulfates; and peroxides, such as tert-butyl hydroperoxide (t-BHP); used alone or in combination with one or more reducing components or activators, such as bisulfites, metabisulfites, ascorbic acid, erythorbic acid, sodium formaldehyde sulfoxylate, ferrous sulfate, ferrous ammonium sulfate, etc. The activator is believed to form a redox couple with the initiator, and promotes faster generation of free radicals.

Enough initiator is used to promote free-radical polymerization of the monomers. Preferably, a small amount of base, e.g., ammonium hydroxide, sodium hydroxide, sodium bicarbonate, etc., is added to the initiator. The base appears to stabilize the emulsion polymerization.

Preferred emulsifiers include both anionic and nonionic surfactants and stabilizers, including without limitation, alkylphenol ethoxylates, such as nonylphenol ethoxylate (a nonionic surfactant sold as POLYSTEP F9 by Stepan Company Inc. of Winnetka, Ill.), alkylaryl sulfonates, such as sodium dodecylbenzene sulfonate (an anionic surfactant sold as Rhodacal DS10 by Rhone-Poulenc, of Cranbury, N.J.), and Rhodacal A246L (an alpha olefin sulfonate available from Rhone-Poulenc). The emulsifiers are employed in an amount sufficient to form stable monomer emulsions.

It is also preferred to employ a chain transfer agent or other molecular weight regulator to control average polymer chain length, crosslinking, and other properties of the acrylic copolymer. Nonlimiting examples include n-dodecyl mercaptan (n-DDM), t-dodecyl mercaptan (t-DDM), monothioglycerol, mercapto acetates, and long chain alcohols.

Generally, emulsion polymerization is carried out by making a pre-emulsion of monomers; charging a reactor, which is heated and purged with nitrogen; continually feeding an emulsified mixture of monomers to the reactor; and adding the initiator to the reactor in a stepped or ramped feed. Preferably, the initiator is introduced slowly at first, and then more quickly as the reaction proceeds. By adding the initiator (or initiator+base) in a stepped or ramped feed, polymerization proceeds in stages, with the initial polymers formed having a low gel content and a high molecular weight non-gel fraction, while the polymers formed at subsequent stages of the reaction tend to have a somewhat higher gel content and a lower molecular weight soluble fraction. Overall number average molecular weights ($M_n$) of the polymers' soluble fractions tend to lie within the range of about 15,000 to about 50,000. Weight average molecular weights ($M_w$) tend to range from about 130,000 to about 400,000.

The following examples are representative, but nonlimiting, embodiments of the invention.

EXAMPLE 1

The identity and amounts of monomers, initiators, surfactants, and other reaction components are set forth below in Tables 1A (Pre-Emulsion), 1B (Initial Reactor Charge), IC (Initiator Solution) and ID (Free Monomer Reduction).

A preemulsion was formed by adding a mixture of monomers (EHA, IBOA, MMA, AA, and HEA) to a pre-mixed aqueous solution of surfactants and stirring until stabilized. A reactor, equipped with a stirrer, heat source and nitrogen inlet, was charged with an aqueous solution of surfactants, an activator, and a chain transfer agent, under a stream of nitrogen.

The nitrogen purged reactor was heated to about 70° C., and a first charge (30 g) of the preemulsion was added to the reactor, which was then heated to 80° C. When the temperature reached 80° C., a small quantity of a polymerization initiator (0.06 g in 2 ml water) was added to the reactor, and an exothermic polymerization reaction commenced.

At the peak of the initial reaction exotherm, the remainder of the preemulsion and catalysts were added to the reactor, over time. Specifically, the preemulsion was steadily added to the reactor over a three-hour period, with the reaction temperature maintained at 80° C. The catalyst was metered into the reactor in a stepped feed, at the rate of 0.17 mL/min. during the first hour and thereafter, at a rate of 0.36 mL/min. for two hours.

After a three-hour period, the reaction mixture was heated for an additional 30 minutes at 80° C., and "free" or unreacted monomers were reduced by adding a small amount of initiator and activator in water.

After an additional 30 minutes at 80° C., the contents of the reactor were cooled, and the emulsion polymer product—a synthetic latex—was removed. The pH of the emulsion was raised to between about 7 and 9 by adding base (ammonium hydroxide). By making the emulsion slightly basic, the stability of the emulsion is improved and the viscosity is increased, making the emulsion easier to coat. The glass transition temperature, $T_g$, of the polymer was calculated (Fox Equation) to be $-34.5°$ C. The THF-soluble fraction of the polymer had a $M_m$ of about 28,000 and a $M_w$ of about 157,000. Solids content was about 54–57%.

TABLE IA

PRE-EMULSION

| Monomer | Mass (g) | Monomer Wt. % |
|---|---|---|
| 2-EHA | 226.0 | 66.3 |
| IBOA | 90.0 | 26.4 |
| MMA | 10.0 | 2.9 |
| AA | 10.0 | 2.9 |
| HEA | 5.0 | 1.5 |
|  |  | 100.0 |

| Surfactant Solution | Mass (g) |
|---|---|
| DS10 | 2.4 |
| A246L | 6.0 |
| Water | 80.9 |
| Water Flush | 20.0 |

TABLE IB

INITIAL REACTOR CHARGE

| Component | Mass (g) |
|---|---|
| Water | 130.00 |
| Surfactants |  |
| Polystep F9 | 0.60 |
| DS-10 | 0.06 |
| Activator Hydro AWC | 0.06 |
| Chain Transfer Agent N-DDM | 0.60 |
| Initiator $Na_2S_2O_8$ | 0.06 |
| Pre-Emulsion | 30.00 |

TABLE IC

INITIATOR SOLUTION

| Initial Feed | | Subsequent Feed | |
|---|---|---|---|
| Component | Mass (g) | Component | Mass (g) |
| Water | 50.0 | Water | 50.0 |
| Initiator $Na_2S_2O_8$ | 1.0 | Initiator $Na_2S_2O_8$ | 1.0 |
| Base | 2.0 | Base | 2.0 |
| 28% $NH_4OH_{(aq)}$ | 53.0 | 28% $NH_4OH_{(aq)}$ | 53.0 |

TABLE ID

FREE MONOMER REDUCTION

| | Component | Mass (g) |
|---|---|---|
|  | Water | 5.0 |
| (1) | Initiator $Na_2S_2O_8$ | 0.1 |
| (2) | Initiator t-BHP | 0.1 |

TABLE ID-continued

FREE MONOMER REDUCTION

| | Component | Mass (g) |
|---|---|---|
| (3) | Activator $Na_2S_2O_5$ | 0.1 |

Using the method described above, Examples 2–4 and Comparative Examples (Comp. Ex.) 1–3 were prepared. The monomeric compositions and glass transition temperatures, $T_g$, (calculated using the Fox Equation) for these examples are provided in Table II. Comparative Example 1 essentially differs from Example 1 in that benzyl methacrylate (BZM) replaces IBOA. Comparative Example 2 lacks IBOA and has increased amounts of MMA and EHA. Comparative Example 3 has only a low (3%) amount of IBOA.

TABLE II

OTHER EMULSION POLYMER EXAMPLES

| Example 2 | Example 3 | Example 4 |
|---|---|---|
| 72% EHA | 68% EHA | 66% EHA |
| 8.9% IBOA | 26% IBOA | 26.5% IBOA |
| 14.6% MMA | 3% MMA | 3% MMA |
| 3% AA | 3% AA | 3% MAA |
| 1.5% HEA | — | 1.5% HEA |
| $T_g$: $-41.3°$ C. | Tg: $-35.5°$ C. | Tg: $-34.7°$ C. |
| Comp. Ex. 1 | Comp. Ex. 2 | Comp. Ex. 3 |
| 67.5% EHA | 78% EHA | 78% EHA |
| 25% BZM | — | 3% IBOA |
| 3% MMA | 17.5% MMA | 14.5% MMA |
| 3% AA | 3% AA | 3% AA |
| 1.5% HEA | 1.5% HEA | 1.5% HEA |
| Tg: $-34.7°$ C. | Tg: $-47.9°$ C. | Tg: $-48°$ C. |

The emulsion polymerization products and methods described above are used to prepare inherently tacky PSA constructions such as tapes, labels, and the like. To that end, a synthetic latex as described above is coated or otherwise applied to a release liner, dried and married or laminated to a paper, polymeric material or film, or other flexible facestock. Nonlimiting examples of polymeric material facestocks include polyolefins, such as polyethylene and polypropylene; polyesters, such as polyethylene terephthalate (PET); and polyvinyl chloride. Alternatively, the synthetic latex is directly applied to a facestock, dried and then married or laminated to a release liner. Thus, a PSA construction is made by applying the latex to a flexible substrate and driving off the water. Linerless PSA constructions can also be made with the PSAs described herein.

The emulsions can be coated using conventional coating techniques including, without limitation, slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating.

The adhesive performance of Examples 1–4, Comparative Examples 1–3, and three commercially available PSAs (Controls 1, 2 and 3) are presented in Tables III (loop tack and 180° peel), IV (envelope adhesion) and V (shear from stainless steel). Control 1 is a leading acrylic emulsion PSA made from a monomer mixture comprising 2-EHA, vinyl acetate (VA), dioctyl maleate (DOM), AA and MAA. Control 2 is an acrylic emulsion PSA similar to Control 1, but also includes butyl acrylate (BA) and is tackified. Control 3 is a leading rubber-based hot-melt PSA based on a Kraton® styrene-isoprene-styrene polymer. (Kraton® polymers are available from Shell Chemical Co., Houston, Tex.).

In each case, test samples were prepared by coating an adhesive on a release paper with a bull nose coater and drying the adhesive for 10 minutes at 70° C. The wet coating weight was adjusted to obtain a dry coating weight of 22±2 g/m². The coated sample was allowed to equilibrate to ambient conditions and was then laminated to 2-mil PET facestock. The laminate construction was conditioned for at least 24 h at 73° F. and 50% RH before adhesive testing.

Loop Tack is a measure of the force required to remove a loop of adhesive-coated facestock from a test substrate after a very short dwell and no external pressure. In our testing, the facestock is 2-mil thick PET and the pull rate is 12-inches per minute. A one-inch by six-inch adhesive coated PET strip is formed into a loop with the adhesive side out. The loop is lowered onto the substrate until the adhesive contacts an area of one square inch. As soon as the tape makes one square inch of contact area with the substrate, the loop is retracted from the substrate. Loop tack is defined as the maximum force required to separate the loop from the substrate. The mode of failure is noted in parentheses; for example, panel (p), cohesive (c) or mixed (m). In the case of a paper or corrugated substrate, the amount of fiber tear or fiber pick is subjectively rated and recorded as a percent. The percent fiber pick is the amount of the tape's surface that is covered by paper fibers. Fiber tear, which indicates a higher level of bonding, is the amount of the tape's surface that is completely covered with paper.

180° Peel Adhesion is a measure of the force required to remove an adhesive coated flexible facestock from a substrate after a specified period of dwell and at a specific angle and removal rate. It is determined in accordance with Pressure-Sensitive Tape Council test PSTC #1. In our testing, the facestock was 2-mil PET, the dwell time was twenty minutes and the pull rate was 12 inches per minute. The adhesive coated strip is placed on the substrate then pressed onto the substrate by rolling twice—once each in opposite directions—with a 4.5 lb rubber roller. After a twenty minute dwell, one end of the test panel is clamped into a tensile tester; the free end of the facestock is doubled back until it is almost touching itself, making an angle of 180° with the substrate, and clamped into the other jaw of the tensile tester. The average force required to separate the adhesive coated facestock from the substrate is recorded as the peel adhesion. The failure mode is noted as described above for the loop tack test.

Shear strength (holding power) is a measure of the cohesiveness or internal strength of the adhesive. In our testing, shear strength was determined in accordance with Pressure-Sensitive Tape Council test method, PSTC #7. The facestock was 2-mil PET and the dwell was 20 minutes. The overlap dimensions were ½"×½" with a static load of 500 grams.

Envelope adhesion was measured by coating the adhesive (emulsion polymer) on a release liner and then transferring the adhesive to a paper facestock that conforms to United States Post Office specification USPS-P-1238C. A 1-inch by 1-inch sample of each construction was adhered to a plain white business envelope. After one minute, the sample was removed by peeling very slowly and in multiple directions. The ratings—G (good), P (poor), F (fair) and E (excellent) are subjective estimates of the amount of fiber tear observed in the peel test.

TABLE III

ADHESIVE PROPERTIES OF SELECTED PSAs

ADHESION TO POLYETHYLENE

| PSA | Loop Tack (N/in) | 180° Peel (N/in) |
|---|---|---|
| Control 1 | 5.5(p) | 4.9(p) |
| Control 2 | 5.5(p) | 4.9(p) |
| Control 3 | 13.0(p) | 12.0(p) |
| Example 1 | 4.1(p) | 10.2(p) |
| Example 2 | 3.6(p) | 8.1(p) |
| Example 3 | 3.9(p) | 5.0(p) |
| Example 4 | 4.4(p) | 3.5(p) |
| Comp. Ex. 1 | 2.6(p) | 6.0(p) |
| Comp. Ex. 2 | 2.8(p) | 6.2(p) |
| Comp. Ex. 3 | 3.5(p) | 4.4(p) |
| Comp. Ex. 4 | 2.4(p) | 5.6(p) |

ADHESION TO CORRUGATED BOARD

| PSA | Loop Tack (N/in) | % Fiber Pick | 180° Peel (N/in) | % Fiber Tear |
|---|---|---|---|---|
| Control 1 | 8.1 | 10 | 4.9 | 70 |
| Control 2 | 7.8 | 10 | 8.5 | 10 |
| Control 3 | 8.2 | 10 | 11.5 | 10 |
| Example 1 | 10.1 | 35 | 8.4 | 95 |
| Example 2 | 7.4 | 5 | 6.6 | 95 |
| Example 3 | 8.6 | 25 | 7.2 | 95 |
| Example 4 | 7.8 | 25 | 5.6 | 95 |
| Comp. Ex. 1 | 6.8 | 5 | 7 | 95 |
| Comp. Ex. 2 | 7.5 | 5 | 6.2 | 75 |
| Comp. Ex. 3 | 7.5 | 5 | 6.7 | 75FP |

TABLE IV

ENVELOPE ADHESION

| PSA | Adhesion |
|---|---|
| Control 1 | good |
| Control 2 | poor |
| Control 3 | fair |
| Example 1 | excellent |

TABLE V

ADHESIVE SHEAR[1]

| PSA | Shear (min) | Failure Mode |
|---|---|---|
| Control 1 | 109[2] | C |
| Control 2 | 135[3] | C |
| Control 3 | 1300 | C |
| Example 1 | 112 | C |
| Example 2 | 84 | C |
| Example 3 | 31 | C |
| Example 4 | 193 | C |
| Comp. Ex. 1 | 136 | C |
| Comp. Ex. 2 | 134 | C |
| Comp. Ex. 3 | 67 | C |

[1] From stainless steel
[2] Best value; the average shear value for Control 1 is about 90 minutes.
[3] Best value; the average shear value for Control 2 is about 70 minutes.

The adhesive test results show that emulsion PSAs prepared in accordance with the present invention exhibit adhesion to both low-energy surfaces and corrugated board comparable to or better than leading tackified and untackified acrylic emulsion PSAs and a leading rubber-based hot melt PSA. The data also shows the excellent adhesion to bond paper exhibited by the PSAs of the present invention, e.g., Example 1. Example 2, having a 9% IBOA content, performed well on both polyethlene (PE) and corrugated board, though not as well as Example 1, having a 26% IBOA content. In general, as IBOA content is lowered, adhesion to low-energy surfaces is reduced. Indeed, Comparative Examples 1 and 2, having no IBOA, showed markedly reduced adhesive performance. Comparative Example 3, having only a low (3%) amount IBOA, also exhibited reduced adhesive performance. Comparative example 1, made with BZM in place of IBOA, exhibited a less favorable balance of adhesive properties—shear, PE adhesion and corrugated adhesion—despite the fact that BZM forms a homopolymer with roughly the same glass transition temperature as IBOA.

Although not bound by theory, the excellent performance characteristics of the adhesives of the present invention are believed to be due to both the monomeric composition of the polymers—including, in particular, the isobornyl acrylate monomer—and the fact that the polymers are formed by emulsion or solvent polymerization, rather than bulk polymerization, such as on web, UV-irradiated bulk polymerization of a syrup of monomers. It is believed that the bulky isobornyl side groups disrupt or affect orderliness in the polymer structure, and the ideal PSA is believed to have a polymer structure that is amorphous and devoid of any side-chain organization or orderliness.

Although the chemistry of emulsion polymerization involves free radical reactions that are common to many bulk and solution polymerization systems, in emulsion polymerization the physical degree of subdivision of the reaction locus and their colloidal nature has a profound influence on the course of polymerization and the characteristics of the product and its performance. Bulk polymerization, of course, tends to yield high molecular weight polymers in a homogeneous phase. In contrast, the emulsion polymerization process of the present invention is heterogenous, and yields a colloidal dispersion of polymer particles sometimes call a latex.

Advantageously, the emulsion and solvent polymers described herein exhibit PSA behavior when coated on a facestock and dried. The adhesives perform quite well on a variety of substrates, and are well suited for a variety of applications, including in self-adhesive postage stamps. Indeed, the high adhesion to paper substrates makes removal and re-use of stamps prepared with the adhesives impractical, due to the telltale fiber tear mark that results when attempts are made to peel off the stamp, even after only a five minute dwell.

The invention has been described in exemplary and preferred embodiments, but is not limited thereto. For example, in an alternate embodiment of the invention, inherently tacky, acrylic polymers are prepared using solvent (solution) polymerization. A monomer mixture comprising an ethylenicaly unsaturated monomer having an isobornyl group (for example, IBOA) and one or more additional monomers (for example, alkyl acrylates, polar monomers, etc.) is dissolved in an organic solvent, a polymerization initiator is added to the solution, and polymerization is allowed to proceed, preferably in an oxygen-free atmosphere. The resulting viscous polymer is diluted with more solvent, and then coated on a release liner, dried, and laminated to a facestock. The following, nonlimiting, example is representative. Control 4 illustrates a solution polymer that lacks IBOA.

EXAMPLE 5

A monomer mixture was prepared by mixing isobornyl acrylate (30.1 g), isooctyl acrylate (75.1 g) and acrylic acid (2.0 g) in ethyl acetate (110.2 g). An initiator, Vazo 64 (0.054 g) (available from DuPont de NeMours, E. I., Co., Wilmington, Del.) was added, and the solution was transferred to a reactor bottle and flushed with nitrogen for five minutes. The bottle was sealed and immersed in an oil bath and heated at 60° C. for 24 hours. The resulting viscous polymer was discharged, and ethyl acetate was added to reduce the solids content to 36%. $T_g$ (measured by differential scanning calorimetry, DSC) was −24° C. The solution was coated on a silicone release liner and dried at 70° C. for 10 minutes. The resulting 30 g/m² film was laminated to a 2-mil thick Mylar® facestock, and 180° peel adhesion to stainless steel, polypropylene and polyethylene panels was measured, after a 24 hour dwell. The results are presented in Table VI.

CONTROL 4

A monomer mixture was prepared by mixing isooctyl acrylate (57.2 g), methyl acrylate (31.1 g), acrylic acid (1.8 g) and ethyl acetate (135.3 g). Vazo 64 (0.048 g) was added as an initiator, and the solution was transferred to a reactor bottle and flushed with nitrogen for five minutes. The bottle was sealed and immersed in an oil bath and heated at 60° C. for 24 hours. The resulting clear viscous polymer was discharged, and ethyl acetate was added to reduce the solids content to 27%. $T_g$ (measured by DSC) was −26° C. The solution was coated on a silicone release liner and dried at 70° C. for 10 minutes. The 30 g/m² film was laminated to a 2-mil thick Mylar® film, and 180° peel adhesion to stainless steel, polypropylene and polyethylene panels was measured, after a 24 hour dwell. The results are presented in Table VI.

TABLE VI

| | 180° PEEL ADHESION (N/in) FOR A SOLVENT POLYMER | | |
|---|---|---|---|
| Sample | 180° Peel to Stainless Steel | 180° Peel to Polypropylene | 180° Peel to Polyethylene |
| Example 5 | 16.8 | 11.1 | 6.7 |
| Control 4 | 13.2 | 4.5 | 3.1 |

The PSAs described herein and their method of preparation are susceptible to various modifications without departing from the invention, which is limited only by the claims.

What is claimed is:

1. A pressure-sensitive adhesive, comprising:
   an inherently tacky emulsion polymer formed from
   (a) a plurality of monomers, comprising, based on the total weight of monomers,
      (i) about 9 to about 40 percent by weight of isobornyl acrylate, and
      (ii) about 50 to about 91 percent by weight of one or more alkyl acrylates, each alkyl acrylate having about 4 to about 8 carbon atoms in its alkyl group;
   (b) an emulsifier; and
   (c) a polymerization initiator.

2. A pressure-sensitive adhesive as recited in claim 1, wherein at least one of the alkyl acrylates is selected from the group consisting of butyl acrylate, ethylhexyl acrylate and isooctyl acrylate.

3. A pressure-sensitive adhesive as recited in claim 1, wherein the isobornyl acrylate is present in an amount of from about 20 to about 30 percent by weight, based on the total weight of monomers.

4. A pressure-sensitive adhesive as recited in claim 1, wherein the plurality of monomers further comprises one or more additional monomers selected from the group consisting of polar monomers, short chain alkyl acrylates and methacrylates having alkyl groups with up to 3 carbon atoms, and monohydric alkyl acrylates and methacrylates having alkyl groups with about 2 to about 8 carbon atoms, said one or more additional monomers present in a total amount of no more than about 20 percent by weight, based on the total weight of all monomers.

5. A pressure-sensitive adhesive as recited in claim 4, wherein said polar monomers are selected from the group consisting of acrylic acid, methacrylic acid, beta-carboxyethyl acrylate, acrylamides, and methacrylamides.

6. A pressure-sensitive adhesive, comprising:
an inherently tacky emulsion polymer formed from
(a) a plurality of monomers comprising, based on the total weight of monomers:
(i) about 20 to about 30% isobornyl acrylate,
(ii) about 50 to about 80% of an alkyl acrylate having about 4 to about 8 atoms in its alkyl group,
(iii) about 1 to about 20% methyl methacrylate,
(iv) about 1 to about 6% acrylic acid, and
(v) about 0.5 to about 6% hydroxyethyl acrylate;
(b) an emulsifier; and
(c) a polymerization initiator.

7. A pressure-sensitive adhesive, comprising:
an inherently tacky emulsion polymer which has been applied to a substrate and dried, said emulsion polymer being formed from
(a) a plurality of monomers, comprising, based on the total weight of monomers,
(i) about 9 to about 40 percent by weight of isobornyl acrylate, and
(ii) about 50 to about 91 percent by weight of one or more alkyl acrylates, each alkyl acrylate having about 4 to about 8 carbon atoms in its alkyl group;
(b) an emulsifier; and
(c) a polymerization initiator.

8. A pressure-sensitive adhesive, comprising:
an inherently tacky emulsion polymer which, when dried and applied to an polyethylene terephthalate facestock, adheres well to low-energy surfaces' paper surfaces, and corrugated board surfaces;
said emulsion polymer being formed from
(a) a plurality of monomers, comprising, based on the total weight of monomers,
(i) about 9 to about 40 percent by weight of isobornyl acrylate, and
(ii) about 50 to about 91 percent by weight of one or more alkyl acrylates, each alkyl acrylate having about 4 to about 8 carbon atoms in its alkyl group;
(b) an emulsifier; and
(c) a polymerization initiator.

9. A method for making a pressure-sensitive adhesive that adheres well to paper, corrugated board and low-energy surfaces, comprising:
forming a synthetic latex by emulsion polymerization of a plurality of monomers comprising:
(i) about 9 to about 40 percent by weight of isobornyl acrylate, and
(ii) about 50 to about 91 percent by weight of one or more alkyl acrylates, each alkyl acrylate having about 4 to about 8 carbon atoms in its alkyl group;
said polymerization taking place in the presence of at least one emulsifier and at least one polymerization initiator.

10. A method as recited in claim 9, wherein the initiator is added to an emulsion of the monomers in a stepped feed.

11. A method as recited in claim 9, further comprising the step of applying the latex to a flexible substrate.

12. A method as recited in claim 9, further comprising the step of drying the latex.

13. A pressure-sensitive adhesive construction, comprising:
an inherently tacky, emulsion polymer applied to a facestock, said polymer formed from
(a) a plurality of monomers, comprising, based on the total weight of monomers:
(i) about 9 to about 40% of an ethylenically unsaturated monomer containing an isobornyl group, and
(ii) about 50 to about 91% of one or more alkyl acrylates, each having an alkyl group with about 4 to about 8 carbon atoms;
(b) an emulsifier; and
(c) a polymerization initiator;
said adhesive construction, when applied to a polyethylene substrate, exhibiting a 180° peel adhesion to polyethylene of at least 3.5N/in and, when applied to a corrugated board substrate, exhibiting a corrugated fiber tear of at least about 90%.

14. A pressure-sensitive adhesive construction as recited in claim 13, wherein the ethylenically unsaturated monomer containing an isobornyl group is isobornyl acrylate.

15. A pressure-sensitive adhesive construction as recited in claim 13, wherein the facestock comprises paper or a polymeric material.

16. A pressure-sensitive adhesive construction as recited in claim 15, wherein the polymeric material comprises polyethlyene, polypropylene, polyvinyl chloride, or polyethylene terephthalate.

17. A pressure-sensitive adhesive construction as recited in claim 13, wherein the construction, when applied to a polyethylene substrate, exhibits a 180° peel adhesion to polyethylene of at least 5.0N/in.

18. A pressure-sensitive adhesive construction as recited in claim 13, wherein the construction, when applied to a polyethylene substrate, exhibits a 180° peel adhesion to polyethylene of at least 8.0N/in.

19. A pressure-sensitive adhesive construction as recited in claim 13, wherein the construction, when applied to a corrugated board substrate, exhibits a corrugated fiber tear of at least 95%.

20. A pressure-sensitive adhesive, comprising:
an inherently tacky, polymer produced by solvent polymerization formed from
(a) a plurality of monomers, comprising, based on the total weight of monomers,
(i) about 9 to about 40 percent of an ethylenically unsaturated monomer containing an isobornyl group, and
(ii) about 50 to about 91% of one or more alkyl acrylates, each having an alkyl group with about 4 to about 8 carbon atoms;
(b) an organic solvent in which the plurality of monomers is soluble; and
(c) a polymerization initiator.

21. A pressure-sensitive adhesive as recited in claim 20, wherein the ethylenically unsaturated monomer containing an isobornyl group is isobornyl acrylate.

22. A pressure-sensitive adhesive as recited in claim 20, wherein the plurality of monomers further comprises, based on the total weight of monomers, up to about 20 percent of one or more additional monomers selected from the group consisting of polar monomers, short chain alkyl acrylates and methacrylates having alkyl groups with up to 3 carbon atoms, and monohydric alkyl acrylates and methacrylates having alkyl groups with about 2 to about 8 carbon atoms.

23. A pressure-sensitive adhesive as recited in claim 20, wherein the plurality of monomers comprises, based on the total weight of monomers, (i) about 28% isobornyl acrylate, (ii) about 70% isooctyl acrylate, and (iii) about 2% acrylic acid.

24. A pressure-sensitive adhesive as recited in claim 20, wherein the organic solvent comprises ethyl acetate.

25. A pressure-sensitive adhesive, comprising:

an inherently tacky polymer formed from
  (a) a plurality of monomers, comprising, based on the total weight of monomers,
    (i) about 9 to about 40 percent by weight of isobornyl acrylate, and
    (ii) about 50 to about 91 percent by weight of one or more alkyl acrylates, each alkyl acrylate having about 4 to about 8 carbon atoms in its alkyl group;
  (b) an emulsifier or solvent; and
  (c) a polymerization initiator;
wherein the pressure-sensitive adhesive is formed upon drying.

26. A pressure-sensitive adhesive as recited in claim 25, wherein the polymer is an emulsion polymer.

27. A pressure-sensitive adhesive as recited in claim 25, wherein the polymer is a polymer produced by solvent polymerization.

28. A pressure-sensitive adhesive as recited in claim 25, wherein at least one of the alkyl acrylates is selected from the group consisting of butyl acrylate, ethylhexyl acrylate and isooctyl acrylate.

29. A pressure-sensitive adhesive as recited in claim 25, wherein the isobornyl acrylate is present in an amount of from about 20 to about 30 percent by weight, based on the total weight of monomers.

30. A pressure-sensitive adhesive as recited in claim 25, wherein the plurality of monomers further comprises one or more additional monomers selected from the group consisting of polar monomers, short chain alkyl acrylates and methacrylates having alkyl groups with up to 3 carbon atoms, and monohydric alkyl acrylates and methacrylates having alkyl groups with about 2 to about 8 carbon atoms, said one or more additional monomers present in a total amount of no more than about 20 percent by weight, based on the total weight of all monomers.

31. A pressure-sensitive adhesive as recited in claim 25, wherein said polar monomers are selected from the group consisting of acrylic acid, methacrylic acid, beta-carboxyethyl acrylate, acrylamides, and methacrylamides.

* * * * *

UNITED STATES PATENT AND TRADEMARK OFFICE
CERTIFICATE OF CORRECTION

PATENT NO. : 5,817,426
DATED : October 6, 1998
INVENTOR(S) : Lon T. Spada; Carol A. Koch It is certified that error appears in the above-identified patent and that said Letters Patent is hereby corrected as shown below:

On the title page, item [56] References Cited, U.S. Patent Documents,
    replace "4,311,729 1/1982 Glennon...428/345"
    with -- 4,311,759 1/1982 Glennon...428/345 --.
Column 2, line 6, replace "3.5N/in" and "5.0N/in" with
    -- 3.5 N/in -- and -- 5.0 N/in --.
Column 2, line 7, replace "8.0N/in" with -- 8.0 N/in --.
Column 6, line 29, change "Tg" to -- $T_g$ -- (both occurrences).
Column 6, line 36, change "Tg" to -- $T_g$ -- (all occurrences).
Column 12, line 18, replace "3.5N/in" with, -- 3.5 N/in --.
Column 12, line 34, replace "5.0N/in" with -- 5.0 N/in --.
Column 12, line 38, replace "8.0N/in" with -- 8.0 N/in --.

Signed and Sealed this

Twenty-sixth Day of September, 2000

Attest:

Q. TODD DICKINSON

*Attesting Officer*      *Director of Patents and Trademarks*